Nov. 8, 1932.   G. KNIGHT   1,886,554
PERFORATING MACHINE
Filed Jan. 14, 1924   2 Sheets-Sheet 1

INVENTOR
George Knight
by his Attorney,
Nelson W. Howard

Patented Nov. 8, 1932

1,886,554

UNITED STATES PATENT OFFICE

GEORGE KNIGHT, OF BROCKTON, MASSACHUSETTS, ASSIGNOR TO BENJAMIN W. FREEMAN, OF CINCINNATI, OHIO

PERFORATING MACHINE      REISSUED

Application filed January 14, 1924. Serial No. 686,153.

This invention relates to perforating machines and is illustrated as embodied in a perforating or punching machine for use in the manufacture of boots and shoes.

One type of perforating machine used extensively in the manufacture of boots and shoes employs interchangeable gang or pattern punches or dies provided with cutting edges arranged according to the pattern of the perforations which it is desired to make. In such a machine, the work is interposed between this die and a co-operating presser member so that, at a single operation of the machine, the cutting of a plurality of perforations corresponding to the whole pattern of the die is effected. Certain patterns, and notably those involving the cut-out or lattice effects now being utilized to a large extent in connection with women's shoes, require the exertion of a very heavy pressure between the die and the presser member in order to effect a clean-cut severance of the cut-out pieces of leather from the balance of the upper. This heavy pressure in turn requires a machine construction having great rigidity, and it is common to provide a substantially rectangular frame upon the base of which the die is supported, and within which is guided a presser member which may be forced against work superposed on the die by suitable operating means. Commonly, too, the die is slidably mounted upon the base of the machine so that it may be brought forward out of the range of the presser member to allow the operator to position the work accurately over the die while it is in plain view and then to push the die and a superposed piece of work back into the frame of the machine into the range of the presser member. Such an arrangement, however, has involved the disadvantage that, with those constructions heretofore used, it was impossible for the operator to maintain a hold upon the work during the operation of the presser member, and, as a result, displacement of the work with respect to the die has not been uncommon. The utilization of such a machine for cut-outs or lattice effects on closed vamps or assembled uppers stitched to form a ring-like structure has been practically impossible heretofore because of the difficulty of positioning the part of the upper to be cut smoothly on top of the die without interference between the machine and other parts of the work.

Accordingly, one object of the invention is to provide an improved perforating machine for cutting openwork patterns in limited portions of closed shoe uppers, in which the portion of the upper to be cut may be smoothly positioned and damage to the remainder of the upper avoided. To this end, in accordance with one feature of the present invention, the width of the die is limited to a dimension enabling it to be inserted within the upper and the die is supported in elevated position above the base by a rigid supporting member of corresponding width so that the portion of the upper to be cut may be placed in flattened condition upon the die while the remainder of the ring-like structure of the upper encircles the sides and end of the supporting member.

Another object of the invention is to provide an improved perforating machine of the general type which has been described above, in which the operator is able to retain a hold upon the work during the operation of the presser member while, at the same time, all possibility of danger to the hands of the operator is avoided. To this end, in accordance with another feature of the invention, the illustrated embodiment of the invention provides for the elevation of the die upon a narrow, rigid, centrally disposed supporting member arranged so that the presser member, in its lowermost position, is still at a considerable distance from the base of the machine, and so that ample spaces are provided laterally of the die support to allow the interposition of the operator's hands to grasp the edges of a piece of work which has been positioned upon the die carried by said support. while at the same time insuring against injury to the operator. Preferably too, guard members will be provided on the machine, so arranged that the operator will be unable to move his hands from the position used in holding the edges of a piece of work to a position between the die and the presser member.

As the die block, which necessarily must be of substantial weight, is moved back and forth from a position convenient for the proper positioning of the work upon the die to a position beneath the presser member, it must be guided in some fashion so that the operator will be assured of a proper coaction between the cutting faces of the die and the presser member when the machine is set in motion. Commonly the base of the machine has been provided with a groove along which the die plate or block was guided by contact with its lateral edges as it was moved forward and backward. But the base does not extend forward sufficiently to support the die in its forward position and, consequently, such an arrangement has generally involved the necessity of providing tracks projecting forwardly from the front of the machine toward the operator so that the die plate would be properly supported when it was moved into its forward position. Such tracks are inconvenient and interfere with the speedy and proper use of the machine by the operator. Further the arrangement necessitated the use of dies all having base blocks of equal widths in order that they might co-operate with the lateral guides upon the base of the machine. Such blocks were usually too wide to allow their insertion within a closed upper.

Accordingly, another feature of the invention consists in the provision of an improved perforating machine of this general type in which the die is supported for movement toward and away from the operator and complemental guide members are interposed between the base of the machine and the die to guide the die irrespective of its width into position beneath the presser member so that the alinement of said die may be maintained as it is moved forward and backward upon the base. Still another feature of the invention consists in the provision of a novel die block having a normally concealed, medially disposed guide member adapted to co-operate with its support by means of undercut, complementally shaped, coacting surfaces upon the die block and the support between their contacting surfaces, to the end that the movements of the die may be restricted to a path defined in two dimensions (vertically and laterally) and the die properly supported as it is moved by means which are compact and self-enclosed. In the illustrated embodiment of the invention, the die plate or block is provided on its under surface with a short downwardly projecting T-shaped tongue, and the support for the die block is correspondingly grooved from the front to rear to receive this tongue. Also means are provided for limiting the movement of the block on the support so as to determine its operating position.

In accordance with a further feature of the invention, the movement of the die block is effected in the illustrated machine by a manually operated device which is received within the groove of the support and connected to the T-shaped tongue upon the die block. This may conveniently take the form of a cord connected to a suitable treadle for the manual operation of the device.

In view of the very extensive surfaces which are sometimes required to be cut in work of the character mentioned, it may be found desirable, with some die patterns, to provide means for pressing the work down in position so that it will be held smooth during the operation of the cutting die. Advantageously, too, such means may be made operable to hold the work in position with only one hand. In accordance with still another feature of the invention, a holddown device is provided having means extending to a safe position out of the range of movement of the presser member which enable the operator accurately to position the work above the die and then to grasp the holddown so as to clamp the work firmly in position over the die during the punching operation. One embodiment of such a device comprises, as illustrated, a holddown plate pivotally attached adjacent to one extremity of the holddown plate and adapted to press the work against a stripper plate, such as is commonly provided upon perforating dies. This holddown plate is extended laterally downwardly to form wings which may safely be retained in the hands of the operator during the operation of the machine as the holddown and the work are pressed against the stripper plate and the presser member operated to cause the work to be cut.

Figures 1, 2, 3, 4:
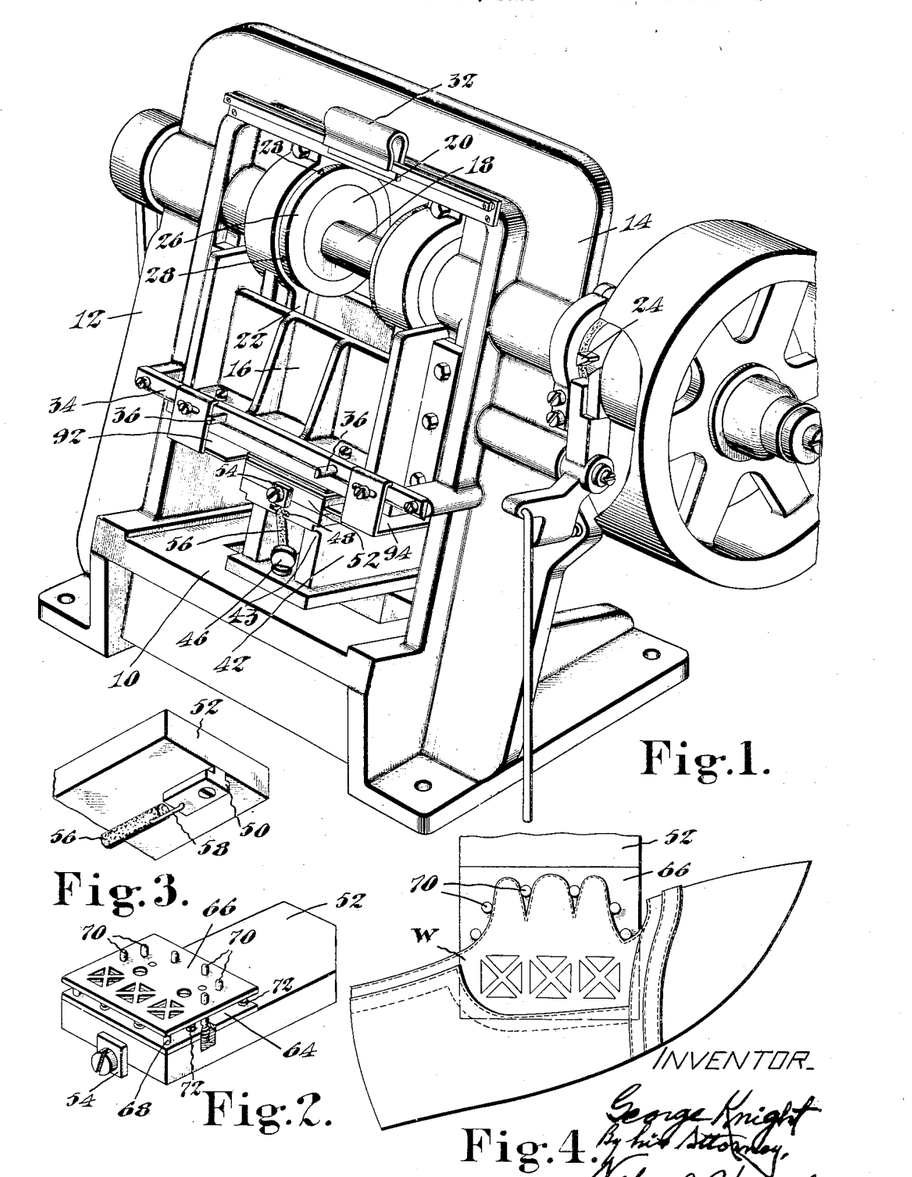
Fig. 1 is a perspective view of the machine in accordance with the invention.
Fig. 2 is a similar view of a die block involving one particular design of the cutting edges.
Fig. 3 is a similar view of the under side of part of such a die block.
Fig. 4 is a plan view showing a piece of work positioned on a die block.

In machines of this general type, a frame of extremely rigid and suitably massive construction is commonly formed with a base portion 10 (Fig. 1) and lateral supports 12 and 14. A presser member 16 is suitably guided for vertical movement between said supports and is adapted to be operated from a rotating shaft 18 having eccentrics 20 and a pitman 22. The rotating shaft 18 is controlled by a suitable clutch, such as that illustrated at 24, under the control of the operator. In order to adjust readily the exact position of the presser member at its lowermost point of movement, it will be found convenient and desirable to provide bushings 26, which are eccentrically bored (not shown) so that when said bushings are rotated by the application of a spanner wrench to the wrench sockets 28, a very fine and accurate adjustment of the position of the presser member corresponding to any position of the rotating shaft may be obtained. In machines of this type, it is common to interpose a sheet of material or a backing member such as heavy paper between the presser member and the cutting die, and, in the illustrated machine, such a sheet is indicated at 30 (Fig. 5) and is guided over the head of the machine and under a resilient tension member 32, then around a transverse bar 34 provided with guide pins 36, and then beneath the presser member to a point at the rear of the machine. Rolls 38 operated in any convenient manner and held together by a spring 39 bearing against the arm 40 carrying the upper roll, may be provided to cause the paper to be drawn along step by step so that fresh portions thereof are presented to the action of the cutting faces of the die at succeeding operations of the machine.

Because of the very heavy pressures involved and the necessity of accurate construction of the machine, in order to provide even pressure of the work against all surfaces of the die to cause a clean severance of the many fibers of the leather, the construction and support of the die itself involve very real difficulties. Evidence of this is found in the fact that even under extremely accurate manufacturing conditions it is frequently found necessary to construct the dies so that their cutting edges extend from two to as much as twelve thousandths of an inch above the desired plane to counteract the tendency to bending and the depression of portions of the die below other portions. When such problems as these are combined with the problems involved in the cutting out of the large openings of the many and irregular shapes which have been brought into use by certain styles of women's shoes, it will be understood that the support of the die block requires careful consideration. Then, too, the positioning of that portion of a closed upper which is to be cut involves very real difficulties because of the necessity of bringing the remainder of the upper which is not to be cut into a position out of alinement with the cutting die and the presser member. Further, it is frequently the case that the design of the shoe necessitates the use of the same die to cut out portions upon various sections of the upper. For example, the same cut-out may be made upon either side of the quarter and in some cases might also be found upon the vamp or the tip. The use of fixed gage devices is, therefore, practically out of the question in many cases, and it becomes necessary for the operator to position the work and hold it in position manually during the cutting operation. Machines now in use, however, are not adapted for the interposition of the operator's hands between the sides of the die plate and the frame of the machine without great danger of injury, and in any case it has been impossible for the operator to insert more than one or two fingers at all regardless of whether or not danger was involved.

Figures 5, 6, 7, 8, 9, 10:
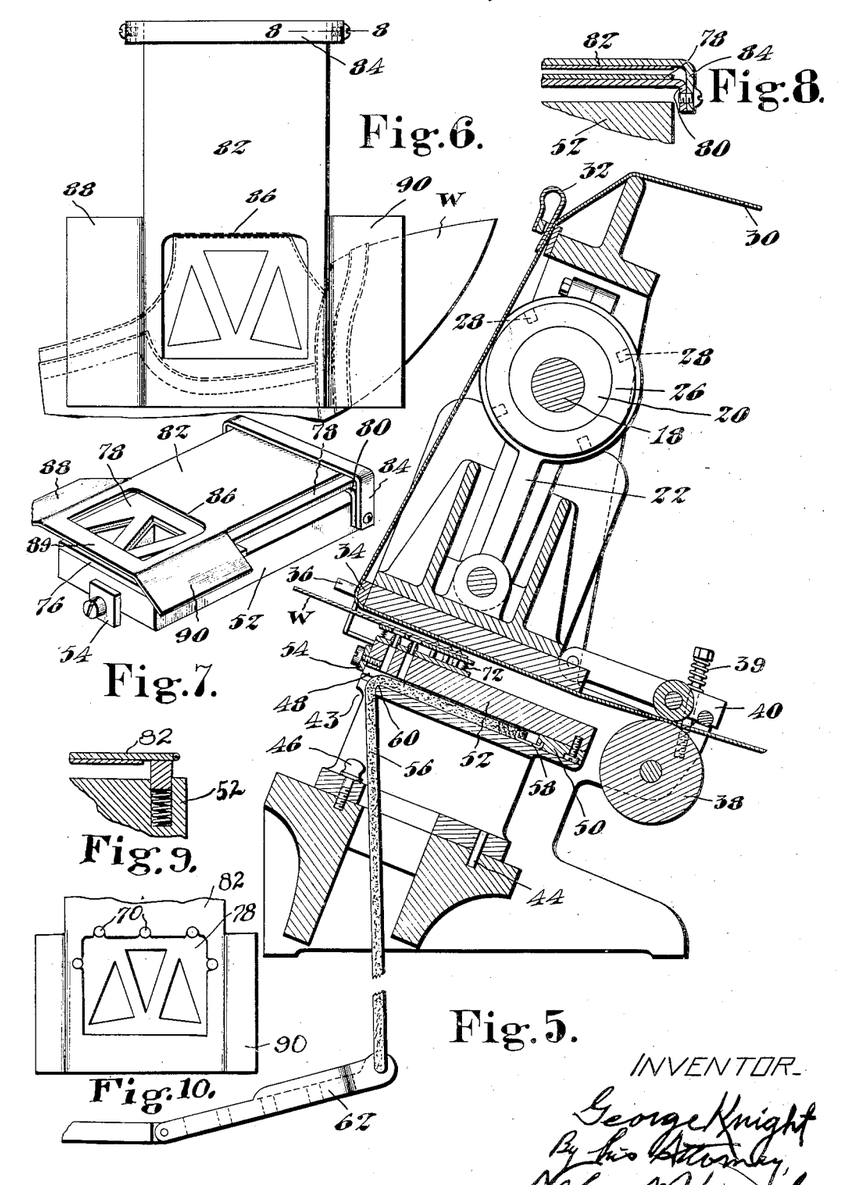
Fig. 5 is a central vertical section through the machine shown in Fig. 1.
Fig. 6 is a plan view of a die block involving another design of the cutting faces and, in connection therewith, a holddown device, or mask.
Fig. 7 is a perspective view of this die block with its holddown, or mask.
Fig. 8 is a detail in section upon the line 8—8 of Fig. 6.
Fig. 9 is a fragmentary detail similar to Fig. 8 but showing a slightly modified mounting of the mask.
Fig. 10 is a fragmentary detail showing one combination of mask and gauging abutment, this view being similar to Figs. 2 and 7.

With these considerations in view, the support for the die plate or block in my improved machine is arranged centrally of the base and comprises a narrow, rigid supporting member 42 (Fig. 1) which may be positioned upon the base directly in the line of pressure by means of a pin 44 and a thumb screw 46 (Fig. 5). The upper side of this supporting member is provided with an inverted T-shaped undercut groove 48 disposed medially thereof for the reception of a complemental T-shaped tongue 50 rigidly attached to the under side of the die plate or block 52. This T-shaped tongue 50 is wholly concealed beneath the die block and provides undercut surfaces and overhanging members which co-operate with the groove of the support in an obvious fashion so that the die may be slid forward and backward upon the support and will always be maintained in rigid alinement and its weight supported even when it is moved to a forward overhanging position. Preferably a stop 54 is provided to determine the operative position of the die upon the support as it slides backward, due to the inclined relation of the parts, into operative position. To bring the die block forward, a suitable cord 56, shown made of leather, is attached to the die block, at 58, to the forward end of the T-shaped tongue. The cord then extends forward along the groove 48 around a rounded portion 60 formed at the rear of a recess at the front of the support and may be attached to a suitable treadle 62 for the manual operation of the device by the operator so that a vertical pull upon the treadle rope will be effective to move the die substantially horizontally from a work-cutting to a work-receiving position.

From a consideration of the construction just described, it will be apparent that the guiding and positioning of the die block, as it is moved forward and backward, are effected by means of a self-contained very compact construction which is independent of the relative width of the die block and the support and does not require the use of forwardly projecting tracks or other devices which would interfere with the convenient use of the machine by an operator. The arrangement is such, too, that it may be used conveniently for punching cut-outs in "closed" uppers, the width of the support 42 being of the proportion illustrated so that the upper may encircle the upper forward corner of the die and the support. The forward vertical edge of the support 42 is relieved at 43 to facilitate the positioning of a closed upper. The machine may be converted for use on open uppers of ordinary character requiring much wider dies, by the substitution of wider supports (not shown) for the support 42.

In accordance with the common method of construction, the cutting faces of the die are formed upon a separate piece 64 (Fig. 2), in any suitable design, attached to the upper face of the block 52 in which passages are formed for the escape of leather cuttings taken out of the work. A stripper plate 66 is provided with openings corresponding to the cutting faces of the die and is guided by means of pins 68 and held away from the die by means of springs 72 so as to allow its depression when the work W is being perforated, and its elevation to a fixed limit to facilitate the immediate removal of the work from the cutting faces of the die upon the completion of the operation. In connection with the perforation of a piece of work of the particular character shown in Fig. 4, it is found convenient to provide gage pins 70, which are resiliently projected through apertures in the plate 64 and the stripper plate 66 and are designed to coact with projections or recesses in the outline of the work accurately to gage the same where the character of the work is such that gaging is possible.

For the proper positioning of the work upon the die, it is desirable in some cases to utilize a mask or holddown plate, which may be apertured to allow the passage of the cutting edges of the die itself but which serves to bear against the work at points outside the cutting edges to keep it positioned and perfectly smooth during the cutting operation. A device suitable for this purpose has been shown in Figs. 6, 7 and 8 in connection with a die plate 76 of somewhat different design mounted upon a die block 52, and this die plate is also provided with a spring-supported, suitably designed stripper plate 78 provided near one end with downwardly extending lugs 80. The gauge mask 82 is also provided with downwardly extending lugs 84, which are pivotally attached to the lugs 80 so that the gauge mask may be lifted for the insertion of the work or pressed tightly against the stripper plate to hold the work in position above the cutting faces of the die. It may not prove desirable to use gage pins such as those shown at 70 (Figs. 2 and 4) for the reason that the design of the work does not provide suitable recesses or corners to be gaged by such pins. It may prove also that the same cut-out dies are to be used upon opposite sides of the work and that their external outline is entirely different so that a gage fitted for one side would not be suitable for the other side and might, in fact, be in the way. In such instances it will frequently be found useful so to arrange the outline of the opening 86 in the holddown that one of its edges will coincide with a fixed feature of the work, such as a line of stitching, and enable the operator accurately to place the work in position upon the die without the provision of any abutting gages. In the particular design illustrated in Fig. 6 it will be noticed that the back side of the opening 86 is arranged to coincide with a line of stitching on the upper. Obviously it is not necessary pivotally to mount the holddown plate upon the die through the agency of the stripper plate as the holddown plate may be mounted directly upon the die block as illustrated in Fig. 9. For the firm retention of the work in the grasp of the operator, the holddown plate is provided with laterally extending, downwardly bent portions or wings 88 and 90, which facilitate the grasp both of the work and of the holddown plate between the operator's thumb and forefinger at the time of the cutting operation. Without a holddown, where an operator grasps the work and positions it manually upon the cutting die in its forward position, it is easily possible for the operator to disturb the position of the work with respect to the die while moving the die and the work back into position for the cutting operation. If, however, a holddown with wing extensions such as that illustrated is used, the operator will be able to take hold both of the edges of the work and the edges or wings of the holddown thus enabling him securely and accurately to position the work with respect to the die and easily to maintain that position when the die is moved back under the presser member. The holddown preferably projects forward of the die block at 89 so that with the die in position in the machine (not shown), the operator may safely rest his fingers on this portion 89 to hold it against the work, with only one hand, if desired, and in many cases this manner of use will provide a sufficient grip upon the work to hold it firmly in place.

The spaces provided between the lowermost limit of movement of the presser member and the central support and the lateral supports are ample for the introduction of the operator's hands so that there is no danger of injury to the operator. It may be found expedient, however, to add to the feeling of security upon the part of the operator and absolutely to prevent the transfer of either hand, from the spaces ordinarily occupied when holding the work to a position between the presser member and the die, by means of guard plates 92 and 94 (Fig. 1) adjustably attached to the transverse paper guide bar 34. Preferably the arrangement of these guards will be such that they will be located in a plane slightly below the plane of the upper surface of the cutting die and will extend approximately from the edge of the cutting die block to the faces of the lateral supports. The operator may then, if desired, when holding the work bear his hands directly against the lower faces of said guards with the knowledge that they will not come into contact with any moving parts of the machine.

In the operation of the device, the die block is first brought forward by depression of the pedal 62, and the die block will be guided in this movement by the coaction of the tongue 50 and the corresponding slot 48 in the support. By using this medially disposed slot 48 as a guide and a recess for the reception of the cord 56, the parts are very compactly arranged, and there are no projecting pulleys or other members to interfere with the operator. After the die has been brought into forward position, the work will be placed thereon, being accurately positioned either by the use of gage pins such as those illustrated at 72 or by gaging some fixed part of the work with respect to the edge of the opening 86 in the holddown plate. The operator will then, in some instance, grasp the edges of the work, and, in case a holddown plate with wings is used, hold them against the lateral extensions 88 and 90 of said plate and be thoroughly in control of the position of the work as the treadle is released and the die block 52 allowed to slide back into position under the action of gravity, the final position being determined by the stop 54. In other cases the pressure of the fingers against the forward end 89 of the holddown plate will be sufficient. The clutch 24 will then be operated to cause the rotation of the shaft 18 and the depression of the presser member to force the work against the cutting faces of the die until said cutting faces pass through the work and then partly through the paper backing strip 30 beneath the presser member. At this time the holddown plate and the stripper plate, if both are used, will be depressed by the presser member below the level of the plane of the top of the cutting edges, and when the pressure has been relieved, the stripper plate will force the work away from said cutting edges. The operator may then again depress the pedal 62 to pull the die forward and allow the removal and replacement of the work.

It will be well understood in the art that it is immaterial, so far as this invention is concerned, whether the die is above or below the work and whether the presser member or the die block is made the movable part. It will also be understood that it is immaterial whether the projecting part corresponding to the tongue 50 is made upon the die block or upon the support as a reversal of this arrangement would be within the scope of the invention. Furthermore, it is obvious that the term "forward" or "forward portion" as used throughout the specification and in the appended claims is intended to be descriptive of that side or direction which normally faces the operator, that is, the side from which the operator normally works. This term is well understood and common in the art, and the term "rearward" or "rearward portion" as used, will of course, refer to the opposite side from that designated as "forward." Other changes may be made within the scope of the invention which is not limited to the exact showing and should be determined by the accompanying claims when construed by reference to the prior art.

Having described my invention, what I claim as new and desire to secure by Letters Patent of the United States is:

1. A machine for cutting openwork patterns in shoe uppers, comprising a rigid enclosed frame, means operating within said frame for bringing together in operative relation a presser member and a cutting die member, and means for supporting one of said members within said frame above the base of the frame constructed and arranged to allow the insertion of the operator's hands within the enclosed frame alongside the die to grasp the edges of a piece of work which is being cut between said presser member and cutting die to hold it taut against said die without danger of injury to the operator.

2. A machine for cutting openwork patterns in shoe uppers comprising a die member having a plurality of sharp-edged tubular cutting members having their cutting edges arranged to cut in an upper openings having the outline of a selected pattern, a co-operating presser member having a smooth substantially unbroken surface for pressing a piece of work against the sharp edges of said cutting members, a bed, and a fixed narrow support thereon upon which said die member is slidably mounted, one of said members being constructed and arranged to permit one portion of a closed upper to be inserted between said members and draped about the support without interference with or injury to the portions of the upper not being cut.

3. A machine for cutting openwork patterns in shoe uppers, comprising a rigid enclosed frame, means operating within said frame for bringing together in operative relation a presser member and a cutting die member, a bed, and a narrow support thereon for elevating one of said members above the bottom of said frame, said parts being constructed and arranged to allow an operator to position part of a ring-like piece of work such as a closed upper smoothly between said die and said presser member without interference between the support and the remainder of the work and to grasp the work within the machine at each side of said support to hold it in position during the operation of the machine.

4. A machine for cutting openwork patterns in shoe uppers, comprising a rigid frame, including a base and lateral supports, a plunger located between and occupying a substantial part of the space between said lateral supports and guided for up and down movement in the opening of said frame, means for operating said plunger, a cutting die, and means fixedly attached to the base of said frame for supporting said cutting die for co-operation with said plunger, said support and said plunger and operating means being constructed and arranged so that there are lateral spaces between the lowest position of the plunger and the base of the machine alongside of said die support and between it and said lateral supports of the frame to allow the operator to insert his hands beneath the plunger to grasp the edges of a piece of work and position it on the die above said die support without danger to the operator.

5. A machine for cutting openwork patterns in shoe uppers, comprising a base, lateral supports, a presser member guided by said supports, means for actuating said presser member toward and away from the base constructed and arranged so that the lowermost limit of movement of the presser member is at a substantial distance above the base, a die for cutting an openwork pattern, and a narrow intermediate support attached to said base and interposed between said lateral supports for elevating said die above the base to a position where it will co-operate with the presser member, said intermediate support being separated from the lateral supports of the frame of the machine sufficiently to allow the operator to insert his hands between the intermediate support and the lateral supports and below the plunger to grasp the edges of a piece of work laid over said die thereby to position it and hold it in position during the operation of the presser member without danger of injury to the hands of the operator.

6. A machine for cutting openwork patterns in shoe uppers, comprising a base, lateral supports, a presser member guided for and down movement between said supports, means for actuating said presser member constructed and arranged so that the lowermost limit of movement of the presser member is substantially separated from the base, a narrow rigid support projecting upwardly from the central part of the base and separated from the lateral supports sufficiently to allow the insertion of the hands of the operator, a die carried by said support, and guard members supported laterally of said central die support, said guard members being constructed and arranged to prevent the operator from moving his hand from the spaces between the central die support and the lateral supports to the space between the die and the presser member.

7. In a perforating machine having a base, a die support thereon, and a die block slidably mounted upon said support for movement from operating position to a location for the aligning of the work upon the die, the under side of said die block and the upper side of said support affording bearing surfaces and being provided intermediate their edges, with guide means having complementally shaped, undercut, coacting surfaces extending in the general direction of movement of the die block.

8. In a perforating machine having a base, a die support thereon, a die block slidably mounted upon said support for movement from operating position to a forward projecting location for the aligning of the work upon the die, the contacting surfaces of the die block and support affording bearings for movement of the block, and means interposed between the contacting surfaces of said die block and said support and intermediate the edges thereof for slidably interconnecting them independently of their relative width constructed and arranged to restrict the movements of the die block to a path defined in two dimensions.

9. In a perforating machine having a base, co-operating members comprising a die support thereon and a die slidably mounted upon said support for movement from operating position to a forward position for the positioning of the work upon the die, means providing a bearing surface between said members and including a projecting tongue upon one member, intermediate the edges thereof and interposed between said die and said support for slidably interconnecting them, said means being constructed and arranged substantially to conceal said projecting tongue in all positions whereby interference with the approach of the operator to the machine when the die is in operating position is avoided.

10. In a perforating machine having a base, a die support thereon, and a cutting die provided with cutting faces upon one surface thereof, said die being slidably mounted with its opposing surface resting upon and forming a bearing with said die support, one of said contacting surfaces between the die and the support being provided intermediate its edges with a projecting tongue and the other of said contacting surfaces being provided with a groove shaped to co-operate with said tongue, whereby the alinement of said die may be maintained when it is moved forward or backward on the die support.

11. In a perforating machine having a base, a die support thereon provided with an undercut groove, and a die provided with cutting faces upon one surface and with a projecting member upon its opposing surface intermediate the edges thereof, said projecting member being adapted to co-operate with said undercut groove to allow sliding movement upon the support while maintaining its alinement with respect to the support.

12. In a perforating machine having a base, a support thereon, a die provided with cutting faces upon one surface and having its opposing surface slidably contacting and forming a bearing with a surface on said support, and means intermediate the edges of said die and said support for connecting them, and to allow sliding movement, comprising an undercut groove on one of said contacting surfaces and a projecting coacting member having an overhanging portion on the other of said contacting surfaces.

13. In a perforating machine having a base, a rectangular support thereon provided with an undercut groove upon its upper surface, a rectangular guide block slidably mounted upon the upper surface of said support, said die block being provided with a downwardly projecting overhanging tongue adapted to co-operate with said undercut groove, said tongue being of less length than said groove, and means connected to said tongue extending along said groove whereby said die block may be manually operated to move it along said die support by the actuation of said means.

14. In a perforating machine having a base, a die support thereon provided with an undercut groove extending toward and away from the operator, a die block slidably mounted on said support and provided with an overhanging tongue co-operating with said undercut groove and occupying a fractional part of the length of said groove, and a treadle rope extending through said groove and connected to said tongue, whereby the die block may be caused to slide with respect to the die support by actuation of said treadle rope.

15. In combination, a cutting die provided with upwardly extending cutting edges, and a holddown device for retaining the work in position upon the cutting die comprising a plate provided with one or more apertures for the cutting edges of the die, said plate being provided with lateral downwardly extending projecting wing portions which may be grasped by the operator better to retain the holddown and the work in position upon the die.

16. In combination, a cutting die provided with extending cutting edges, a stripper plate resiliently mounted on said die constructed and arranged to lift a piece of work off the cutting edges, and a holddown plate pivotally mounted on said stripper plate.

17. In combination, a cutting die provided with extending cutting edges, a stripper plate resiliently mounted on said die constructed and arranged to lift a piece of work off the cutting edges, and a holddown plate pivotally mounted to said stripper plate, said holddown plate being provided with a lateral extension to enable the operator to press it against the work.

18. In combination, a cutting die provided with extending cutting edges, a stripper plate resiliently mounted on said die constructed and arranged to lift a piece of work off the cutting edges, and a holddown plate pivotally mounted on said stripper plate, said holddown plate being pivotally attached to the rear end of the stripper plate and provided adjacent to its forward end with lateral downwardly projecting extensions adapted to be grasped by the operator to press the holddown plate against the work.

19. A cutting die for a perforating machine having a base, including a block provided with cutting members upon one surface thereof, said block being also provided with an undercut surface intermediate its edges, adapted to co-operate with a complementally shaped surface upon a support on said base, whereby the die may be slidably mounted upon the support for movement in two opposite directions, independently of said cooperating surfaces, and rigidly positioned thereon against displacement in other directions.

20. A die for a perforating machine having a base comprising a block provided with cutting edges upon one surface, the opposing surface of said block being constructed and arranged to provide a bearing for the block an undercut surface intermediate the edges of the block and extending along a portion of said block in the direction in which it is desired to have the block move on a suitable support on said base, said undercut surface being constructed and arranged to co-operate with a complementally shaped surface upon a suitable support, whereby the movements of the die may be accurately controlled and its position rigidly maintained against displacement in other directions.

21. A die for a perforating machine having a base comprising a block provided with cutting edges upon one surface of the block and a member projecting from the opposite face of the block intermediate the edges thereof, said block being provided with undercut surfaces and overhanging parts, said member being adapted to co-operate with a complementally shaped portion on a suitable support on said base to guide and control the position of the die as it is moved to a point where it overhangs the edge of the support.

22. A die for a perforating machine having a base, comprising a block provided with cutting edges upon one surface of the block and a projecting T-shaped member upon another surface of the block, intermediate the edges thereof and of less length than the said surface, said T-shaped member being adapted to co-operate with a complementally shaped groove in a suitable support on said base, whereby the movements of the die along the support may be accurately controlled.

23. A die for a perforating machine having a base, comprising a block provided with cutting edges upon one surface of the block and a projecting member, intermediate the edges of the block and upon the opposite surface of the block adapted to be received in a groove in a suitable support on said base, said projecting member being provided with means for the attachment of an operating cord positioned in said groove.

24. In a perforating machine, a frame including a base, a presser member guided in said frame for reciprocating movement toward and away from said base, a die support on said base, a die on said support and mounted for movement toward and away from the operator to carry it into position beneath said presser member, where the lateral edges of the work may be held by the operator without danger of crushing the operator's hands and complemental guide members interposed between said base and said die and located intermediate the edges of the die extending in a path parallel to the path of movement of the die to guide the die, irrespective of its width, into a position beneath the presser member so that the alinement of said die may be maintained as it is moved forward and backward upon the base.

25. In a machine for cutting openwork patterns in shoe uppers, a base, lateral supports, a presser member guided by said supports, a die for cutting an openwork pattern, means for supporting said die in an elevated position above said base, a supporting bar extending across in front of the machine between said lateral supports, and guard members adjustably mounted upon said supporting bar adapted to be positioned adjacent to said die to prevent the operator from accidentally moving his hands from a position beside the die to a position between the die and the presser member.

26. In a perforating machine, a base, lateral supports, a presser member guided for movement toward and away from the base by said lateral supports, a transverse bar for guiding a strip of backing material passing beneath the presser member, a die supported upon said base for cooperation with said presser member, and guard members carried by said transverse bar laterally of said die.

27. A die for a perforating machine, said die having one or more cutting members secured to and projecting from a block, stripping means associated therewith and guiding means formed upon the under surface of the die block intermediate the edges thereof and adapted to co-operate with a corresponding guide element in the machine to guide the movement of the die as it is transferred from a work-placing position to a work-cutting position.

28. A die for a perforating machine comprising a supporting block, said die having one or more cutting members secured to and projecting from said supporting block, and a guide member formed upon the under surface of the supporting block and intermediate the edges of the block so that it will co-operate with a similarly disposed guiding member on the base of the machine, irrespective of the width of the die, to guide the movement of the die as it is transferred from a work-placing position to a work-cutting position.

29. In a perforating machine, an elevated support, a die block supported for front to back movement upon said support, complemental guide elements interposed between said block and said support, a treadle rope for moving the die block, means upon said die block for attaching the treadle rope, and means upon said support for guiding said treadle rope arranged so that a downward pull upon the treadle rope will cause a movement of the die block from a work-perforating position to a forward work-placing position.

30. A machine for cutting openwork patterns in limited areas of the surface of the ring-like structure of a closed shoe upper prior to its attachment to the sole of a shoe comprising a frame having a base, a presser member mounted for movement toward and away from the base, a cutting die having a die block to which are secured projecting cutting edges outlining the pattern to be cut in the shoe upper, the width of the die block being limited substantially to the width of the area of the shoe to be cut, and a narrow fixed support interposed between the cutting edges of the die and the base of the machine, and attached to said base, in line with the path of movement of the presser member to resist the thrust of the presser member, having a width corresponding to the width of the die and having one of its upright surfaces relieved to facilitate the draping of the ring-like structure of the shoe upper smoothly about the support.

31. A perforating machine comprising a frame having fixed platen guides; a reciprocating platen movable in said guides; a fixed bed arranged in a plane substantially at right angles with the path of the platen, and extending under the latter, an anvil manually movable on the bed and provided with punches adapted to cooperate with the platen, the bed and anvil being provided with complemental guide elements, adapted and arranged to guide the anvil in a path parallel with the plane of the bed, the frame, the bed and the anvil being formed and arranged to provide spaces at the opposite sides of the anvil, and below the upper surface thereof for hands holding the work; and downwardly facing hand guards supported by the frame above the bed and overhanging said spaces, said guards being extended inward from their forward ends to protect the operator's fingers when the anvil is in different operative positions.

32. A perforating machine comprising a frame having fixed platen guides; a reciprocating platen movable in said guides; a fixed bed arranged in a plane substantially at right angles with the path of the platen, and extending under the latter, an anvil manually movable on the bed and provided with punches adapted to cooperate with the platen, the bed and anvil being provided with complemental guide elements, adapted and arranged to guide the anvil in a path parallel with the plane of the bed, and permit anvils of different widths to be used interchangeably with the bed, without change or adaptation of the guide elements, downwardly facing hand guards supported by the frame above the bed, means for laterally adjusting the guards so that they may conform in position to anvils of different widths, the frame, the bed, and the anvil being formed and arranged to provide spaces at the opposite sides of the anvil, and below the upper surface thereof for hands holding the work; said guards overhanging said spaces, being extended inward from the forward ends to protect the operator's fingers when the anvil is in different operative positions.

33. A perforating machine comprising a frame having fixed platen guides; a reciprocating platen movable in said guides; a fixed bed arranged in a plane substantially at right angles with the path of the platen, and extending under the latter, an anvil manually movable on the bed and provided with punches adapted to cooperate with the platen, the bed and anvil being provided with complemental guide elements, adapted and arranged to guide the anvil in a path parallel with the plane of the bed, and permit anvils of different widths to be used interchangeably with the bed, without change or adaptation of the guide elements, the frame, the bed, and the anvil being formed and arranged to provide spaces at the opposite sides of the anvil, and below the upper surface thereof for hands holding the work; the frame being provided with a fixed transverse rod, located above the path of the anvil, and downwardly facing hand guards detachably secured to the rod and overhanging said spaces, said guards being extended inward from their forward ends, to protect the operator's fingers when the anvil is in different operative positions, and laterally adjustable on the rod, so that they may conform in position to anvils of different widths.

34. A perforating machine comprising a reciprocating platen movable in fixed guides on the frame of the machine; a fixed bed arranged in a plane substantially at right angles with the path of the platen, and provided with a centrally located internal anvil guide element extending from front to rear of the bed; and an anvil manually movable on the bed and including a base portion having a centrally located complemental external guide element slidably engaged with the guide element of the bed, and a head portion provided with punches adapted to cooperate with the platen, said guide elements being adapted and arranged to guide the anvil in a path parallel with the plane of the bed, and permit anvils of different widths to be used interchangeably with the bed, without change or adaptation of the guide elements.

35. A perforating machine comprising a frame including platen guides, a bed arranged in a plane substantially at right angles with the guides, and having an anvil guide element medially located between opposite lateral edges of the bed; a reciprocating platen movable in said platen guides; and an anvil manually movable on the bed and provided with a guide element medially located between opposite sides of the anvil, and engaging the aforesaid guide elements on the bed, thus providing spaces at opposite sides of the anvil for the operator's hands.

36. In a perforating machine, an anvil provided at its upper portion with punches, and at its base portion with a guide element medially located between opposite lateral sides of the anvil, and adapted to cooperate with a fixed guide element medially located between opposite lateral edges of an anvil-supporting bed.

37. In combination, a cutting die provided with a member having extending cutting edges, work supporting means and an abutment on the die to act as a gauge in positioning work to be cut by said cutting edges, and a holddown for clamping the work.

38. A die comprising a base, a cutter extending from said base, a movable plate having an opening larger than said cutter, means for guiding said plate in its movements, gaging means comprising an abutment on said die associated with said plate and a holddown movable toward and from said plate.

39. In combination, a cutting die provided with cutting edges, a stripper plate resiliently mounted on said die constructed and arranged to lift a piece of work off the cutting edges, gaging means comprising an abutment on said die associated with said plate, and a holddown plate movable toward and from said stripper plate.

40. In combination, a cutting die provided with cutting edges, an abutment on said die against which work is placed, and a gauge plate resiliently mounted on said die and adapted to be lowered against the work, said plate being provided with edges shaped to correspond to predetermined characteristics of the work, one of said shaped edges being constructed to act as a gage for the positioning of a portion of the work beneath the holddown.

41. In combination, a cutting die provided with cutting edges, and a gauge mask for the work to be cut, a support therefor, and means resiliently mounting said gauge mask on said support.

42. In combination, a cutting die provided with cutting edges, gaging means and work holding means for the work to be cut, a support for said last means, and means to resiliently mount said work holding means on said support.

43. In combination, a cutting die provided with cutting edges, a work supporting means, and a mask for the work to be cut, and means to resiliently mount said mask on the die.

44. In combination, a cutting die comprising a base member, a member thereon and having extending cutting edges, studs mounted in said base, a gauge plate for the work to be cut carried by said studs, and resilient means in combination with said studs adapted to permit movement of said gauge plate normal to the plane of said cutting edges while maintained parallel thereto.

45. In combination, a cutting die comprising a base member, a cutting member thereon and having extending edges, a holddown plate for the work to be cut, a resilient mounting for said plate to permit movement of said holddown plate normal to the face of the cutting edges while maintained parallel thereto, said plate having a portion hinged to said mounting, the hinged portion of said holddown plate comprising lugs extending from the clamping face of said plate and cooperating with corresponding lugs on said mounting having horizontal journal openings.

46. In combination, a cutting die provided with a member having extending cutting edges, an abutment on said die to act as a gage in positioning the work to be cut by said cutting edges and a mask for the work to be cut, and means resiliently mounting said mask on the die.

47. In combination, a cutting die provided with cutting edges, and a resiliently mounted gauge plate adapted to be lowered against the work, said plate being provided with edges shaped to correspond to certain portions of the work, an edge of said plate being constructed to act as a gage for the positioning of a piece of work beneath the plate.

48. In a perforating machine having a reciprocating platen, a die support mounted in said machine, and a cutting die provided with cutting edges, said die being mounted for reciprocatory movement on said support into and out of dieing position, the contacting surfaces between the die and the support being provided with cooperating means to maintain the alignment of the die, when it is moved relative to the die support.

49. In a perforating machine, a die support mounted in said machine and a cutting die provided with cutting edges upon one surface thereof, said die being slidably mounted in engagement with said support, one of the contacting surfaces between the die and the support being provided with a projection, and the other of said contacting surfaces being provided with a groove cooperating with said projection whereby the alignment of said die may be maintained when it is moved relative to the die support.

50. In a perforating machine, a die support mounted in said machine and a cutting die provided with cutting edges upon one surface thereof, said die being slidably mounted in engagement with said support, the contacting surface of the die opposed to the cutting edge surface and between the die and the support being provided with a projection and the other of said contacting surfaces being provided with a groove to cooperate with said projection whereby the alignment of said die may be maintained when it is moved relative to the die support.

51. In a perforating machine, a die support mounted in said machine and a cutting die provided with cutting edges, said die being slidably mounted in engagement with said die support, the contacting surfaces between the die and the support being provided with cooperating means to maintain the alignment of the die when it is moved relative to the die support, means providing a relatively soft surface opposed to the cutting edges of said die and against which said cutting edges are directed.

52. In a perforating machine, a die support mounted in said machine, and a cutting die provided with cutting edges upon one surface thereof, said die being slidably mounted in engagement with said die support, one of the contacting surfaces between the die and the support being provided with a projection, and the other of said contacting surfaces being provided with a groove cooperating with said projection, whereby the alignment of said die may be maintained when it is moved relative to the die support, means providing a relatively soft surface opposed to the cutting edges of said die and against which said cutting edges are directed.

53. In a perforating machine, a die support mounted in said machine, and a cutting die provided with cutting edges upon one surface thereof, said die being slidably mounted in engagement with said die support, the contacting surface of the die opposed to the cutting edge surface and between the die and the support being provided with means cooperating with the other of said contacting surfaces, whereby the alignment of the die may be maintained when it is moved relative to the die support, means providing a relatively soft surface opposed to the cutting edges of said die and against which said cutting edges are directed.

54. In a perforating machine, a die support mounted in said machine, and a cutting die provided with cutting edges upon one surface thereof, the said die being slidably mounted in engagement with said die support, the contacting surface of the die opposed to the cutting edge surface and between the die and the support being provided with a projection, and the other of said contacting surfaces being provided with a groove to cooperate with said projection, whereby the alignment of said die may be maintained when it is moved relative to the die support, means providing a relatively soft surface opposed to the cutting edges of said die and against which said cutting edges are directed.

55. In a perforating machine having a frame, with an extended supporting portion on said frame, an elevated die support detachably and rigidly mounted on said portion, and a cutting die provided with cutting edges upon one surface thereof, said die being slidably mounted relative to said die support, means to provide maintenance of alignment of said die, when it is moved relative to the die support.

56. A cutout machine having in combination a work supporting means and a cutting die assembly comprising a member having cutting edges, and a gaging means, said gaging means having an edge and an abutment cooperative to permit proper positioning of the work to be cut by said cutting edges.

57. In combination a cutting die provided with cutting edges and a resiliently mounted plate adapted to be lowered against the work, said plate being provided with an edge portion constructed to act as a gage for the positioning of a piece of work in alignment with the cutting edges of the die.

58. In combination, a cutting die provided with cutting edges, die supporting means comprising a supporting member in the frame of the machine, provided with a work supporting surface elevated in the frame and constructed to provide spaces below the elevated work supporting surface for at least one hand holding the work on the supporting member, a movable gage member, and means to guide said gauge member for movement through a plane normal to the plane of said cutting edges during the cutting operation.

59. In combination, a cutting die provided with cutting edges, die supporting means comprising a supporting member in the frame of the machine, provided with a work supporting surface elevated in the frame and constructed to provide spaces below the elevated work supporting surface for at least one hand holding the work on the supporting member, a movable gage member, and means to guide said gauge member for movement through a plane normal to the plane of said cutting edges during the cutting operation, said member being provided with a gage element to permit positioning of a piece of work in alignment with the cutting edges.

60. A cutout machine having in combination, a frame with an extended supporting portion on said frame, an elevated die support removably mounted in said machine, and a cutting die assembly mounted for reciprocatory movement on said elevated support, comprising a block having cutting edges thereon, and a stripper plate mounted on said block in cooperative relation to said cutting edges, and means providing a relatively soft surface opposed to said cutting edges and against which said edges are directed.

61. A machine of the kind described, comprising die supporting means, cutting devices having cutting edges, pressure applying means, and backing material toward which the cutting edges are directed, said machine providing for a portion of the work substantial work receiving spaces disaligned from the plane of operation, and having resiliently mounted gaging means located between said backing material and the cutting edges, effective to permit positioning of the work relative to said edges.

62. In a machine for forming openwork in shoe uppers, the combination with a frame and a pressing member of a cutting-out tool, a support therefor mounted on said frame, said tool being mounted on said support for reciprocatory movement, and a work supporting member on said frame provided with an elevated work supporting surface and constructed to provide surfaces below the elevated work supporting surface for at least one hand holding the work on the work supporting member.

63. In a die press, the combination with a frame, a pressing member and a cutting-out tool supported other than by the pressing member, of a work supporting member on said frame, adapted to fit inside of a made shoe upper, provided with a work supporting surface elevated in said frame, upon which the portion of the upper to be operated upon is positioned flatwise, and provided with a depression below the elevated surface in which another portion of the upper may be positioned by at least one hand holding the work on the work support, and resiliently mounted gaging means located between the pressing member and the cutting-out tool effective to permit aligning of the work with said tool.

64. In combination a cutting die provided with a member having cutting edges, a work supporting means and an abutment on the die to act as a gage in positioning work to be cut by said cutting edges, and a hold-down for clamping the work, said machine being constructed and arranged to provide a substantial space along the lateral sides of the work supporting means sufficiently large to admit thereto at least one hand to hold the work.

65. In a stilt anvil cutout die for shoe cutouts, a die holder, a yieldably supported stripper plate therefor and a mask plate hingedly connected to the stripper plate.

66. In a stilt anvil cutout die for shoe cutouts, a die holder, a stripper plate yieldably supported by the die holder, a mask plate hingedly connected at one edge to the rear end of the stripper plate to prevent shifting of the mask plate relative to the stripper plate and so the stripper plate and the mask plate will be movable upon the die holder as a unit.

67. In combination, a cutting die provided with cutting edges, work supporting means, and a gauge plate for the work to be cut, means to move said gauge plate to clamp the work therebetween and relative to said cutting edges, means to guide said plate through a plane normal to the plane of said cutting edges during the cutting operation, said plate having edges shaped to conform to a predetermined characteristic of the work, whereby the work may be accurately aligned relative to said die.

68. In combination, a cutting die provided with cutting edges, work supporting means, and a gauge plate for the work to be cut, movable relative to said cutting edges, means, including pins mounting said plate upon said die, to guide said plate through a plane normal to the plane of said cutting edges during the cutting operation, said plate having edges shaped to conform to a predetermined characteristic of the work whereby the work may be accurately aligned relative to said die.

69. In combination, a cutting die provided with cutting edges, work supporting means and a gauge plate for the work to be cut, means to move said gauge plate to clamp the work therebetween, means to guide said plate through a plane normal to the plane of said cutting edges during the cutting operation thereby preventing disalignment of the work during intervals when the work is located and pierced by said cutting edges.

70. In combination, a cutting die comprising a base member, a work support mounted thereon, a cutting member on said base member having extending cutting edges, a gauge plate for the work to be cut out, a resilient mounting in said base member for said plate effective to permit a movement of said plate relative to said work supporting member, means to move said plate thereby to clamp the work between said plate and said support, and means to guide said plate in its movement, through a plane normal to the plane of said cutting edges and parallel to said edges when the work is located and pierced by said cutting edges.

71. In combination, a cutting die provided with extending cutting edges, a stripper plate resiliently mounted on said die constructed and arranged to lift a piece of work off the cutting edges, and a gauge plate connected to said stripper plate, means adapted to be grasped by the operator to press the gauge plate against the work, said stripper and gauge plate being mounted to move through a plane normal to the plane of the cutting edges thereby preventing disalignment of the work during intervals when the work is moved to operating position and pierced by said cutting edges.

72. In combination, a cutting die provided with cutting edges to cut designs in shoe upper materials, a stripper plate upon which is supported a shoe upper made up of two or more pieces of material, the edge of at least one of said pieces of material being shaped to extend relatively close to a cutout design to be cut in said shoe upper, and a gauge plate connected to said stripper and movable toward and from said stripper to allow the operator to place the work on the stripper and then clamp the work therebetween by lowering the gauge plate thus preventing disalignment of the work when moved with the die from work placing to work cutting position, means to guide said gauge plate through a plane normal to the plane of said cutting edges thereby preventing disalignment of the work during intervals when the work is moved to operating position and pierced by said cutting edges, said gauge plate having an edge shaped to conform to the edge of one of said parts whereby the shoe upper may be accurately aligned relative to said cutting edges and to the shaped edge of said shoe upper part.

73. In a shoe ornamenting machine having a frame provided with an extended supporting portion, an elevated die support fixed thereto, and provided with means for holding a cutting die unit in proper operating position mechanism movable on said elevated support comprising a die unit having a relatively narrow, light die block shaped to receive a fitted shoe upper and provided with means cooperating with said holding means in controlling the proper positioning of said die unit, said unit having guiding means for controlling the proper positioning and movement of said unit.

74. A cutting die adapted for use in a machine having a frame provided with an extended supporting portion, an elevated support fixed thereto, said die comprising one or more cutting member having cutting edges, a block movable on said elevated support from work receiving to work cutting position, said block having a forward portion overhanging said elevated support when in work receiving position and upon which portion the cutting members are mounted, and a rear portion, the under surface of which is constructed and arranged to engage the elevated support while the block is maintained in work receiving position thereon.

75. A cutting die adapted for use in a machine having a frame provided with an extended supporting portion, an elevated support fixed thereto, said die comprising a member having cutting edges, a cutting die block movable on said elevated support from work receiving to work cutting position, a gauge on said block for use in positioning the work, said block having a forward portion overhanging said elevated support when in work receiving position and upon which portion the cutting members are mounted, and a rear portion, the under surface of which is constructed and arranged to engage the elevated support while the block is maintained in work receiving position thereon.

76. A cutting die adapted for use in a machine having a frame provided with an extended supporting portion, an elevated support fixed thereto, said die comprising a member having cutting edges, a cutting die block movable on said elevated support from work receiving to work cutting position, said block having a forward portion upon the top surface of which the cutting members are mounted, and having the under surface of said forward portion out of engagement with the elevated support when in work receiving position.

77. A cutting die adapted for use in a machine having a frame provided with an extended supporting portion, an elevated support fixed thereto, said die comprising a member having cutting edges a cutting die block movable on said support from work receiving to work cutting position, a gauge on said die for use in positioning the work with relation to the cutting members, said block having a forward portion upon the top surface of which the cutting members are mounted, and having the under surface of said forward portion out of engagement with the elevated support when in work receiving position.

In testimony whereof I have signed my name to this specification.

GEORGE KNIGHT.